United States Patent [19]

Lore

[11] 4,045,904
[45] Sept. 6, 1977

[54] FISH HOOK EXTRACTOR
[76] Inventor: Joseph C. Lore, Ridge, Md. 20680
[21] Appl. No.: 681,288
[22] Filed: Apr. 28, 1976
[51] Int. Cl.² ............................................. A01K 97/00
[52] U.S. Cl. ..................................................... 43/53.5
[58] Field of Search ......................................... 43/53.5
[56] References Cited
U.S. PATENT DOCUMENTS

| 2,998,670 | 9/1961 | Edwards | 43/53.5 |
| 3,603,021 | 9/1971 | Nunley | 43/53.5 |
| 3,706,154 | 12/1972 | Luebbers | 43/53.5 |

Primary Examiner—Warner H. Camp
Attorney, Agent, or Firm—B. P. Fishburne, Jr.

[57] ABSTRACT

An elongated bar equipped at one end with a twisting handle has a loop formed on its opposite end and the end of the loop is positioned at one side of the bar with a small gap existing between a corner of the loop end and the bar. The arrangement forms a wedge passage through which a fish hook being twisted for extraction by the user of the device cannot escape.

1 Claim, 4 Drawing Figures

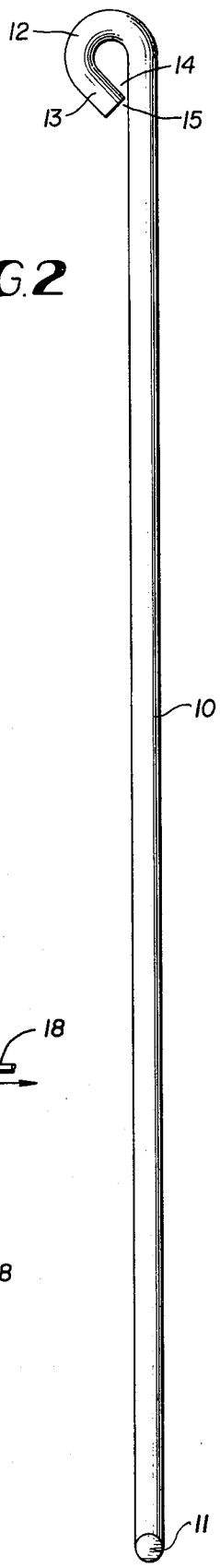
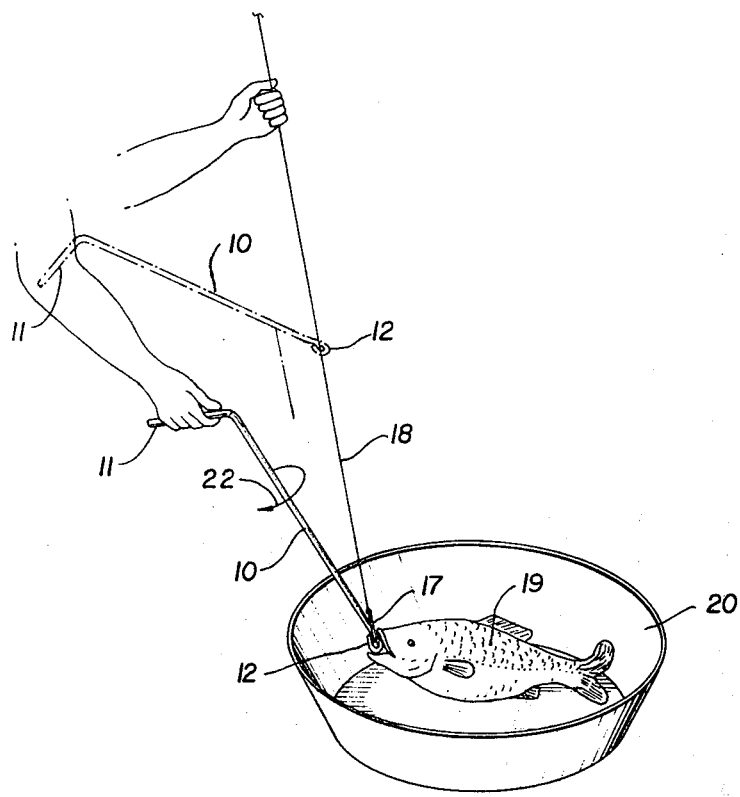
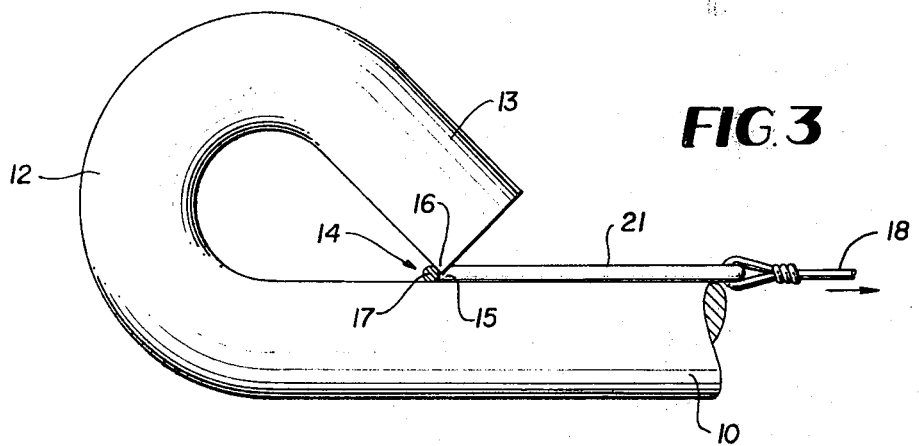
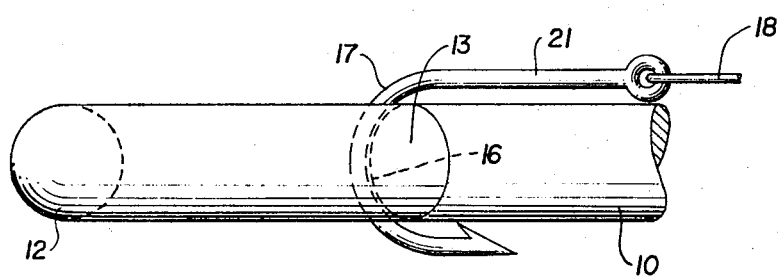

FISH HOOK EXTRACTOR

BACKGROUND OF THE INVENTION

A variety of fish hook extractors or disgorgers have been proposed in the prior art and some examples of the patented prior art are U.S. Pat. Nos. 2,289,767; 2,781,599; 3,713,243; and 3,888,038. These prior art devices vary in their modes of use as well as in their cost of manufacturing, degrees of complexity and efficiency for their intended purposes.

The object of the present invention is to provide a fish hook extractor which is characterized by extreme simplicity of construction, convenience of use and economy of manufacturing. The extractor embodying the present invention facilitates dislodging hooks from fish without touching the fish with the hands, thereby eliminating the possibility of injury due to biting or cutting with fins. The extractor possesses a simpler and more effective mode of operation than any known prior art device and is constructed to positively engage the fish hook in a wedge passage from which the hook cannot escape during a firm twisting motion applied at a remote handle.

The extractor can be made in a few sizes to accommodate substantially all sizes of fish hooks employed in game fishing.

The fish hook extracting process, by means of the invention, is faster and more sure than with prior art devices.

Other features and advantages of the invention will become apparent during the course of the following detailed description.

BRIEF DESCRIPTION OF DRAWING FIGURES

FIG. 1 is a perspective view of the invention depicting its mode of use.

FIG. 2 is an enlarged side elevational view of the invention.

FIGS. 3 and 4 are further enlarged fragmentary elevational views at right angles to each other showing the engagement of a fish hook within a wedge passage of the extractor at the time of twisting and showing the formation of a loop on the extractor which forms the wedge passage in conjunction with the straight shank of the implement.

DETAILED DESCRIPTION

Referring to the drawings in detail wherein like numerals designate like parts, a fish hook extractor according to the invention comprises a straight bar body portion 10 formed of metal rod stock and preferably having a length of approximately 18 inches for convenience of use, although the length is not critical. At one end, the bar body portion 10 has an integral right angular handle 11 which is employed to manipulate the extractor in a manner to be fully described.

At its opposite end, the extractor body portion has a partially closed eye or loop 12 formed thereon preferably in a plane at right angles to the plane defined by the handle and body portion 11 and 10. The loop 12 forms the key element of the invention and makes possible the unique and improved operation embodied in the invention.

The loop 12, as illustrated, is circularly formed away from the straight body portion 10 and toward one side thereof for approximately 225° and terminates in a straight portion or side 13 disposed at an angle of 45° to the body portion 10, as shown in FIG. 3. A wedge passage 14 is thus formed between the two angularly disposed straight elements 10 and 13 and a narrow gap 15 is provided between the inner corner 16 of loop terminal 13 and the straight body portion 10. As will be further described, the gap 15 which is provided permanently in the device prevents the escape of a fish hook 17 from the wedge passage 14 during the extraction operation but allows for the free passage of a fishing line 18 or leader through the gap 15 when required.

In practice, the extractor will be manufactured in approximately three sizes with the width of the gap 15 varying in each size, and in this manner the invention will accommodate virtually the full range of commercial fish hook sizes. The principle of operation is identical for all sizes.

In the use of the extractor, the fish 19 caught on the hook 17 may be placed over or within a suitable receptacle 20 or at the bottom of a trash can, if preferred. In some cases, the fish may simply be placed on the floor for the extraction operation. In any case, the line or leader 18 is passed through the gap 15 and into the loop 12 and while the leader is held with one hand, the extractor is slid downwardly along the leader 18 while being held with the other hand by the handle 11, as shown in FIG. 1. The loop 12 will eventually pass over the shank 21 of the fish hook and while the leader is held by the hand under tension, the loop 12 is forced downwardly against the floor or against the bottom of the receptacle 20. This will cause the curved part of the hook 17 to enter the wedge passage 14, FIG. 3, and to engage firmly between the elements 10 and 13 at the gap 15. The hook cannot pass through the restricted gap, as explained. While the leader 18 remains tensioned, extractor body portion 10 is twisted or rotated on its longitudinal axis by turning the right angular handle 11, such action being depicted by the arrow 22 in FIG. 1. A strong twisting force can be exerted on the hook 17 with very little effort on the part of the user and the wedged engagement of the hook in the passage 14 causes the hook to be turned and dislodged from the fish no matter how firmly embedded therein. The extraction is quick and clean and the hands of the user are away from the fish for safety. The extractor may be easily engaged with the fish hook from any angle by merely sliding the loop 12 down the leader 18, as described. No other manipulations of the device are required except for moving it along a line or leader to a solid surface while the line is held under tension and then simply twisting. There is no way that the hook can resist the twisting action or escape prematurely from the loop 12. The device is characterized by economy, simplicity, efficiency of operation and convenience of use. The advantages of the invention over the prior art should now be apparent.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A fish hook extractor comprising an elongated rigid bar member of circular cross section, a handle extension on one end of the bar member for rotating the bar member on its longitudinal axis during use, and a substantially circularly curved rigid loop integrally formed on the other end of the bar member and extending away from one side of the bar member and lying in a plane with the bar member, the handle extension projecting laterally of the bar member substantially normal to said plane, said loop terminating in a straight side extension arranged at an angle of about 45° to the longitudinal axis of the bar member, said straight side extension having a square end face forming on the extension a substantially square corner closely spaced from one side of the bar member so that a fishing line or leader for a predetermined size of fish hook may pass through the small gap between said square corner and bar member, and said gap blocking passage of the predetermined size of fish hook therethrough so that the hook when introduced into the loop cannot leave the loop by way of the small gap, said straight side extension converging with said bar member and forming therewith a wedge passage by means of which the bight of a fish hook within the loop can be engaged and firmly twisted by manual rotation of the bar member on its longitudinal axis.

* * * * *